Patented May 16, 1944

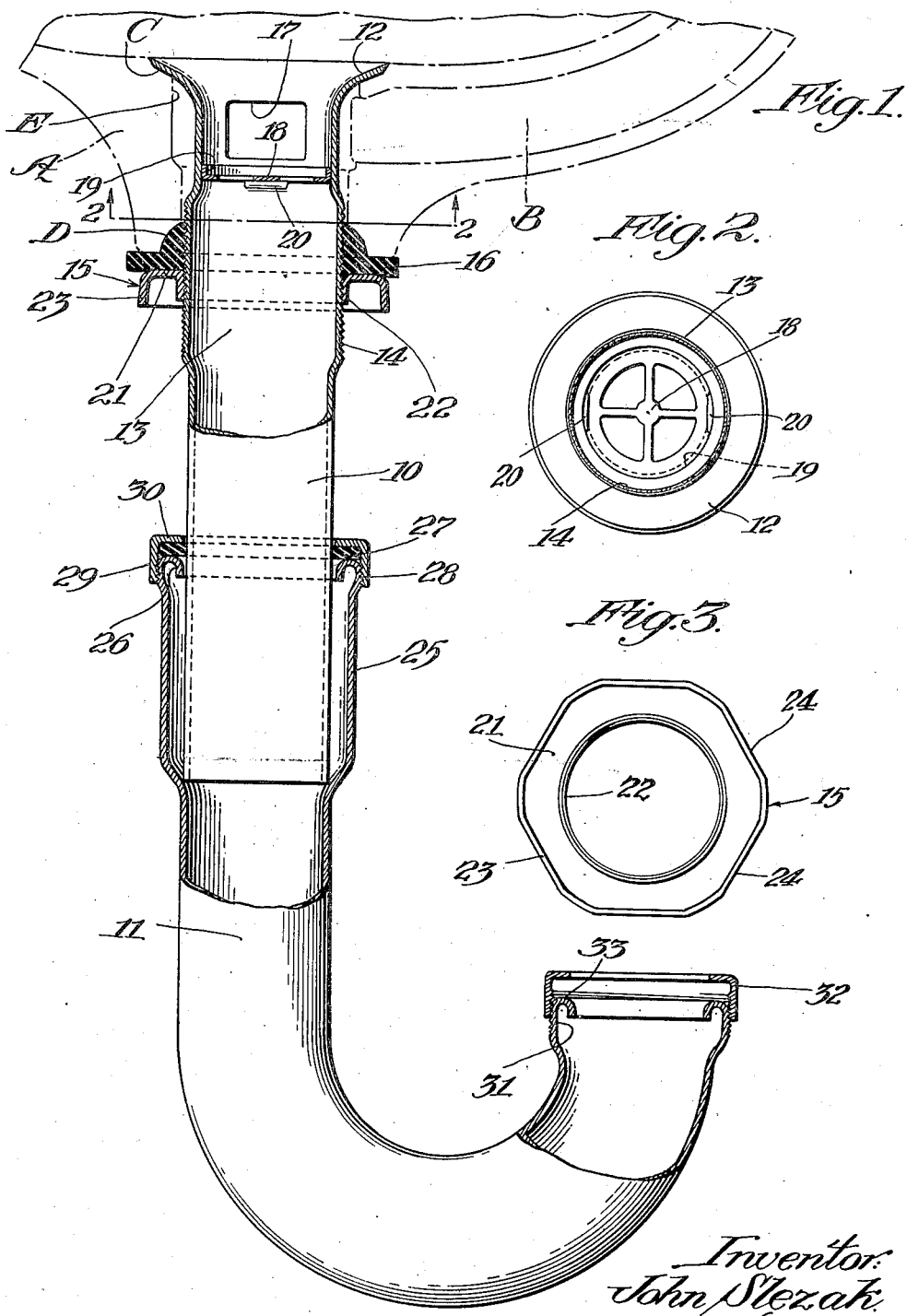

2,349,202

UNITED STATES PATENT OFFICE 2,349,202

DRAIN FITTING

John Slezak, Sycamore, Ill., assignor to Turner Brass Works, Sycamore, Ill., a corporation of Illinois Application August 3, 1942, Serial No. 453,333

5 Claims. (Cl. 4—288)

This invention relates to plumbing fixtures in the nature of drain fittings and the like, and is shown embodied in a part designed for connecting a sink or lavatory bowl with a drain pipe.

One object of the invention is to provide a new and improved drain fitting for the purpose indicated.

Another object of the invention is to provide a one-piece fitting composed of thin, metallic tubing with a portion expanded slightly beyond its original diameter and externally threaded.

A further object of the invention is to provide a unitary drain fitting comprising a flanged, tubular member threaded for a portion of its length to receive a clamping nut adapted to cooperate with the flange in securing the fitting in place.

More specifically, it is an object of the invention to provide a drain fitting which can be manufactured from a unitary length of thin, steel tubing by flaring one end of the tubing to form a flange and by expanding a portion of the tubing and forming directly thereon an external thread for a clamping nut.

Other objects and advantages of the invention will appear from the following description taken in connection with the drawing, in which:

Fig. 1 is an elevational view taken partially in section at an axial plane of the fitting, and showing the structure embodying this invention.

Fig. 2 is a top plan view of the fitting.

Fig. 3 is a transverse section, taken as indicated at line 3—3 on Fig. 1.

While I have shown in the drawing and shall herein describe in detail a preferred form of my invention, it is to be understood that I do not intend to limit the invention to the specific form or application disclosed, but aim to cover all modifications and alternative constructions falling within the scope of the invention as expressed in the claims.

One fitting to which this invention relates may be employed as the outlet pipe from the bottom of a sink or lavatory, and to clearly indicate its mode of use Fig. 1 shows a fragment of the lower portion of a lavatory bowl at A, including the overflow passage B which customarily leads from an outlet near the upper edge of the bowl. The drain outlet in the bottom of the bowl includes a countersunk marginal portion C into which the metallic tubular fitting of this invention is secured.

The fitting, as shown, is constructed from a length of straight, metallic tubing and comprises a smooth, cylindrical portion 10 which is adapted to telescope with the adjacent fitting, which is ordinarily a U-shaped trap member shown at 11. At the upper end, the tubing is flared outwardly to form a flange 12 which seats in the countersunk surface C of the lavatory bowl. An intermediate portion 13 of the tubing is expanded slightly beyond its original diameter and is externally threaded at 14 to receive a clamping nut 15. When the nut is tightened upwardly against the seal washer 16 seating in a recess D at the lower end of the drain outlet of the bowl A, the fitting is firmly secured in place by the cooperative clamping action of the nut 15 and the flange 12. The portion 13 of the tube can be readily expanded by means familiar to those skilled in the art, and the threads at 14 may be either cut or pressed into the external surface of the expanded portion. This avoids the necessity of threading the tubing all the way to its lower end and leaves the lower end portion 10 in its original, smooth surfaced condition, which is preferable for its telescopic engagement with the part 11.

The portion of the drain fitting immediately below the flange 12 is provided with one or more ports 17 and the surrounding portion E of the drain opening of the bowl A is somewhat larger than the diameter of the metallic drain fitting, thus providing an annular space connecting the overflow passage B with the outlet ports 17 in the drain fitting. Just below the outlets 17 a strainer disk 18 is secured in the drain fitting by engagement of its peripheral flange 19 therein, and this strainer is positioned by lodgement against inwardly pressed bosses 20 formed in the metallic wall of the fitting member. Thus the drain fitting itself comprises only two pieces, the tubular member with its flange 12 and with its expanded portion 13, together with the strainer disk 18 secured permanently in the tube.

The clamping nut 15 may also be made of sheet metal comprising a transaxial web portion 21 with an annular, inner flange 22 internally threaded to fit the threads 14 of the fitting. A peripheral flange 23 is of non-circular outline, providing six flat faces 24 corresponding to the flat sides of a hexagon nut. This construction of the nut provides ample strength for the purpose, while conserving a considerable weight of metal as compared with a solid nut structure; in this particular use the nut requires only one flat bearing face, which is afforded by the transaxial portion 21 which bears against the sealing washer 16.

Heretofore, the practice was to make the drain fitting in at least two parts, the upper portion including the flange to seat in the opening in the bowl, with a depending threaded portion integral therewith. A second tubular member having a flange at its upper end was then screwed onto the threaded portion of the first member into engagement with the sealing washer for clamping the parts in position, the second member having a depending cylindrical part for engagement with the U-tube or trap. This involved telescoping or overlapping the two parts which were threaded together, and such overlapping engagement was of considerable extent to allow for variations in thickness and construction of different lavatory fixtures. The present construction conserves the metal previously required for this telescopic arrangement, and also saves labor and time formerly employed in working up the two separate pieces. It also reduces the shipping weight of the final product.

The U-shaped trap member 11 shown in connection with the main fitting is also of thin metal tubing, and its upper end portion is expanded at 25 to provide clearance for telescopic engagement with the cylindrical portion 19 of the drain fitting proper. The upper edge of the part 25 is curled inwardly, as seen at 26, providing an upwardly facing lodgement surface for a sealing washer 27. As shown, the extreme upper portion of the trap member is slightly expanded beyond the diameter of the part 25, and is externally threaded at 28 to receive the threaded flange 29 of the cup-shaped nut 30 which confines and encloses the sealing washer or packing member 27. Similarly, at its opposite end the U-tube 11 is formed with an expanded terminal portion 31 externally threaded to receive a packing nut 32, and internally curled or beaded at 33. In addition to providing seating area for packing washers, such as that shown at 27, the inwardly curled or beaded portions 26 and 33 reinforce and stiffen the threaded terminal portions of the U-tube.

I claim as my invention:

1. A drain fitting comprising a unitary, tubular member having one end flared to form a flange and having an intermediate portion slightly expanded beyond the original diameter of the tube and externally threaded to receive a clamping nut for cooperation with the flange in securing the fitting in place, said expanded portion having a smooth, internal wall and the adjacent lower portion being of the original diameter of the tube and of substantial length.

2. A drain fitting comprising a unitary, tubular member having its upper end flared to form a flange, the other end being of straight cylindrical form, and an intermediate portion of the tube being slightly expanded beyond the diameter of the lower end portion and externally threaded, together with an apertured strainer disk peripherally flanged and fitted snugly in the tube above said expanded portion, the tube having inwardly pressed bosses serving to position said strainer disk.

3. A drain fitting comprising a unitary, tubular member having its upper end flared to form a flange and having a portion spaced below said flange and slightly expanded beyond the original diameter of the tube with threads on the external surface only of said expanded portion to receive a clamping nut, the portion of the tube intermediate said flange and said expanded portion having an inlet port for communication with an overflow passage in the fixture in which the fitting is mounted, and the portion of the tube below said expanded portion being of substantial length and of the original diameter.

4. A drain fitting comprising a unitary, tubular member flanged at its upper end and having a wall of substantially uniform thickness throughout its length, but with a portion thereof slightly expanded beyond the original diameter of the tube and externally threaded, and a clamping nut formed of sheet metal with an inner annular flange internally threaded and engaging the threaded portion of the tube and with a peripheral flange of non-circular form to receive a wrench, said flanges being connected by a transaxial web portion and extending downwardly therefrom, whereby the web is exposed upwardly for contact with a sealing member when the nut is adjusted to secure the fitting in place.

5. A drain fitting comprising a unitary member of relatively thin-walled tubing having its upper end flared in the form of a flange dimensioned to seat in the counter-sunk margin of the drain outlet of a lavatory fixture or the like, an adjacent portion of the tube having a port in its wall for communication with an overflow passage formed in the fixture to discharge laterally into the drain outlet thereof, an opertured strainer disk fitted tightly in the tubular fitting below said port, the wall of the tube having inwardly pressed bosses against which said disk is lodged, and a portion of the tubing below the strainer being expanded slightly beyond its original diameter and externally threaded, and a nut on said threaded portion adjustable upwardly thereon toward the under surface of the fixture for clamping the fitting in place with suitable packing means interposed between said nut and said under surface of the fixture said member including a substantial length of unthreaded tubing of the original diameter extending downwardly from said threaded portion.

JOHN SLEZAK.